(12) United States Patent
Healey et al.

(10) Patent No.: US 9,077,574 B1
(45) Date of Patent: Jul. 7, 2015

(54) DSP SERDES RECEIVER WITH FFE-DFE-DFFE DATA PATH

(71) Applicant: LSI Corporation, San Jose, CA (US)

(72) Inventors: Adam B. Healey, Newburyport, MA (US); Chaitanya Palusa, Fremont, CA (US); Tomasz Prokop, Pleasanton, CA (US); Volodymyr Shvydun, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/227,120

(22) Filed: Mar. 27, 2014

Related U.S. Application Data

(60) Provisional application No. 61/947,738, filed on Mar. 4, 2014.

(51) Int. Cl.
*H04L 25/03* (2006.01)
(52) U.S. Cl.
CPC .............................. *H04L 25/03057* (2013.01)
(58) Field of Classification Search
USPC .......................................... 375/233, 229, 322
See application file for complete search history.

(56) References Cited

U.S. PATENT DOCUMENTS

| | | | |
|---|---|---|---|
| 6,421,381 B1 * | 7/2002 | Raghavan | 375/233 |
| 7,760,830 B2 * | 7/2010 | Shoor | 375/350 |
| 8,121,185 B2 | 2/2012 | Cohen | |
| 8,693,532 B2 * | 4/2014 | Pandey et al. | 375/232 |
| 2008/0205563 A1 * | 8/2008 | Simpson et al. | 375/350 |
| 2013/0243066 A1 | 9/2013 | Palusa et al. | |
| 2014/0307826 A1 * | 10/2014 | He | 375/293 |

OTHER PUBLICATIONS

Haftbaradaran, Afshin, et al., "Mismatch Compensation Techniques Using Random Data for Time-Interleaved A/D Converters", IEEE 2006, pp. 3402-3405.
Frazier, Howard, et al., "Feasibility of 100 Gb/s operation on installed backplane channels", May 2011, 21 pages.

* cited by examiner

*Primary Examiner* — Kabir A Timory
(74) *Attorney, Agent, or Firm* — Suiter Swantz pc llo

(57) ABSTRACT

A SerDes receiver device can receive binary signals via wireline channel such that information recovery is primarily or entirely performed via DSP algorithms in the digital domain includes an analog to digital converter, adaptation and calibration blocks, and a sequential n-way parallel equalization data path. The data path provides preliminary equalization of digital input symbols through a feed forward equalizer block followed by a decision feedback equalizer block, to which a k-slice decision feed forward equalizer block is appended for generating equalized hard decision outputs. The decision feed forward equalizer block may include a concatenation of cascading DFFE slices to improve the performance of the data path.

17 Claims, 4 Drawing Sheets

DSP SERDES RECEIVER WITH FFE-DFE-DFFE DATA PATH

CROSS-REFERENCE TO RELATED APPLICATIONS

This application claims priority under 35 U.S.C. §119(e) to provisional patent application U.S. Ser. No. 61/947,738 filed on Mar. 4, 2014. Said application is hereby incorporated by reference herein in its entirety.

TECHNICAL FIELD

This invention relates generally to data communications and particularly to method and apparatus for a high-speed, wire-line, digital serialization/deserialization (SerDes) receiver.

BACKGROUND

Architecture for serializer/deserializer (SerDes) receiver data path processing generally combines a front-end continuous-time linear equalizer (CTLE) and a decision feedback equalizer (DFE). These equalizing components are automatically adjusted using adaptive algorithms, e.g., least mean squares (LMS). For high-speed applications, data path equalization components are most often implemented as analog, transistor-level circuits while the adaptation is implemented via digital blocks.

An alternative method is to implement only an analog to digital converter (ADC) as an analog circuit, processing the received signal fully in the digital domain. A digital signal processing (DSP) data path of this nature offers technical potential for advanced DSP algorithms, expanding applications to extra long reach (XLR) channels or modulation schemes higher than non-return to zero (e.g., PAM-4). A digital receiver additionally has better reliability, testability and flexibility compared to its analog counterparts, and is easier to port across technology nodes.

There are at least two major technical challenges associated with building a DSP SerDes receiver: first, the technical feasibility of a high-speed, low-power ADC for digitizing a received analog signal, and second, lower clock speeds in the digital domain as opposed to analog alternatives. The former can be addressed by contemporary ADC architectures. The latter requires parallelization of hardware, which in turn creates its own set of challenges. It may be desirable to provide a primarily or fully digital SerDes receiver that provides high speed performance while minimizing the necessary area.

SUMMARY

Embodiments of the invention concern a proposed system for receiving binary signals via wireline channel such that information recovery is primarily or entirely performed via DSP algorithms in the digital domain, and a SerDes receiver implementing the proposed system architecture. Embodiments of the proposed receiver are designed to receive PAM-4 or NRZ/PAM-2 symbols at a data rate of 12.5 to 14 GS/s. In some embodiments, the system architecture includes an analog to digital converter (ADC) at the front end and a sequential 8-way parallel data path including a Feed Forward Equalizer (FFE) followed by a Decision Feedback Equalizer (DFE) followed by a Decision Feed Forward Equalizer (DFFE). The sequential combination of DFE and DFFE equalizers can provide high performance while minimizing the necessary area. Embodiments of the data path according to the invention can process eight digital samples of the signal per clock cycle at a frequency one-eighth times the transmitted symbol rate. In embodiments, the system architecture can further include a baud rate clock/data recovery (CDR) block with expanded gradient calculations (3-value sign+magnitude error signal) and an ADC calibration block.

BRIEF DESCRIPTION OF THE DRAWINGS

Embodiments of the invention may be better understood by those skilled in the art by reference to the accompanying figures in which.

DETAILED DESCRIPTION

Figure 1:
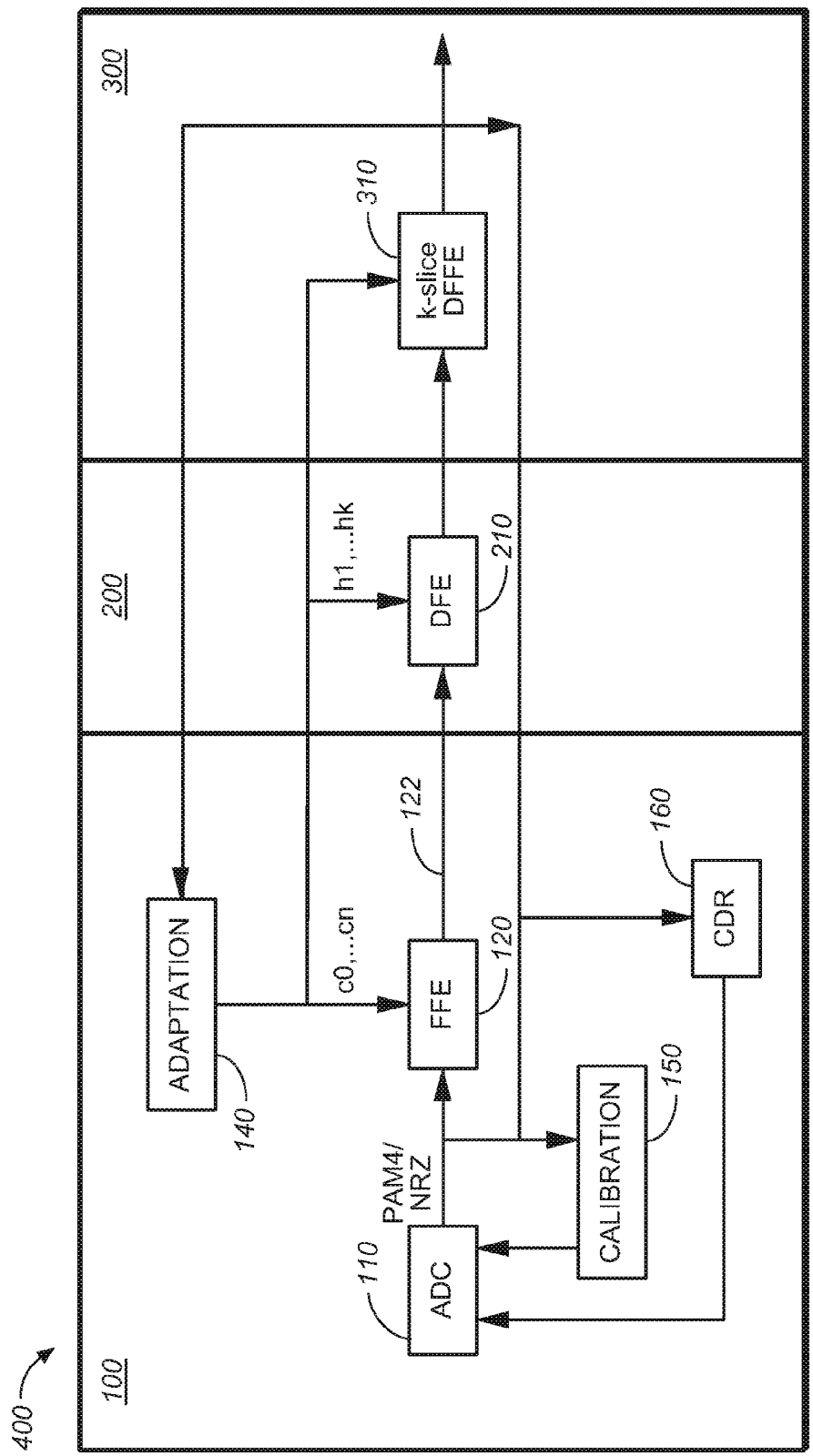
FIG. 1 is a block diagram of an embodiment of the invention.

FIG. 1 illustrates an embodiment of a FFE-DFE-DFFE data path 400 for a digital serializer/deserializer (SerDes) receiver device according to the invention. In embodiments of data path 400, section 100 can include the essential minimum for a DSP SerDes receiver employing analog to digital converter (ADC) 110 and feed forward equalizer (FFE) 120. Section 200 can append to section 100 a decision feedback equalizer (DFE) block 210. For prior art combinations of a FFE-DFE data path to achieve a desired performance, a large number of FFE taps (e.g., 32) is required, which increases area proportionally and may adversely affect the filtered signal due to the large amount of fixed point arithmetic operations. The large size of a parallel DFE architecture restricts the DFE to at most 2 taps.

In embodiments of the invention, a DSP SerDes receiver can include a data path 400 that appends to a combination of FFE block 100 and DFE block 200 block 300, including decision feed forward equalizer (DFFE 310. In embodiments DFFE 310 can include a concatenation of a plurality of DFFE slices (ex.—cascading DFFE stages, elementary DFFE units). The performance of embodiments of DFFE 310 (ex.—probability of error) can then be adjusted through the concatenation of more or fewer DFFE slices or through DFFE analysis. In embodiments, a SerDes receiver device according to the invention can reduce the necessary number of taps used by FFE 120 to 8 or fewer due to the performance advantage realized by appending DFFE 310. The total area required for embodiments of data path 400 can also be reduced as the added area required for appending DFFE 310 can be outweighed by the area saved in reducing the number of taps used by FFE 120.

Embodiments of DSP SerDes equalization data path 400 can also include a high speed, low power analog to digital converter (ADC) 110 with phase interpolator and clock generator, adaptive filter (ex.—adaptation block) 140, ADC calibration block 150, and clock/data recovery (CDR) block 160. In embodiments of data path 400, the three n-way parallel filters are sequentially arranged: FFE 120 in block too, then DFE 210 in block 200, then DFFE 310 in block 300. Fully digital ADC calibration block 150 can measure parameters of the sampled analog signal and corrects offset or gain mismatches and clock errors inside ADC 110. Adaptive filter 140 can automatically adjust coefficients for all three equalizing filters (e.g., $c_0 \ldots c_n$ for FFE 120, $h_1 \ldots h_k$ for DFE 210) via least mean squares (LMS) or other adaptive algorithms.

Figure 2:
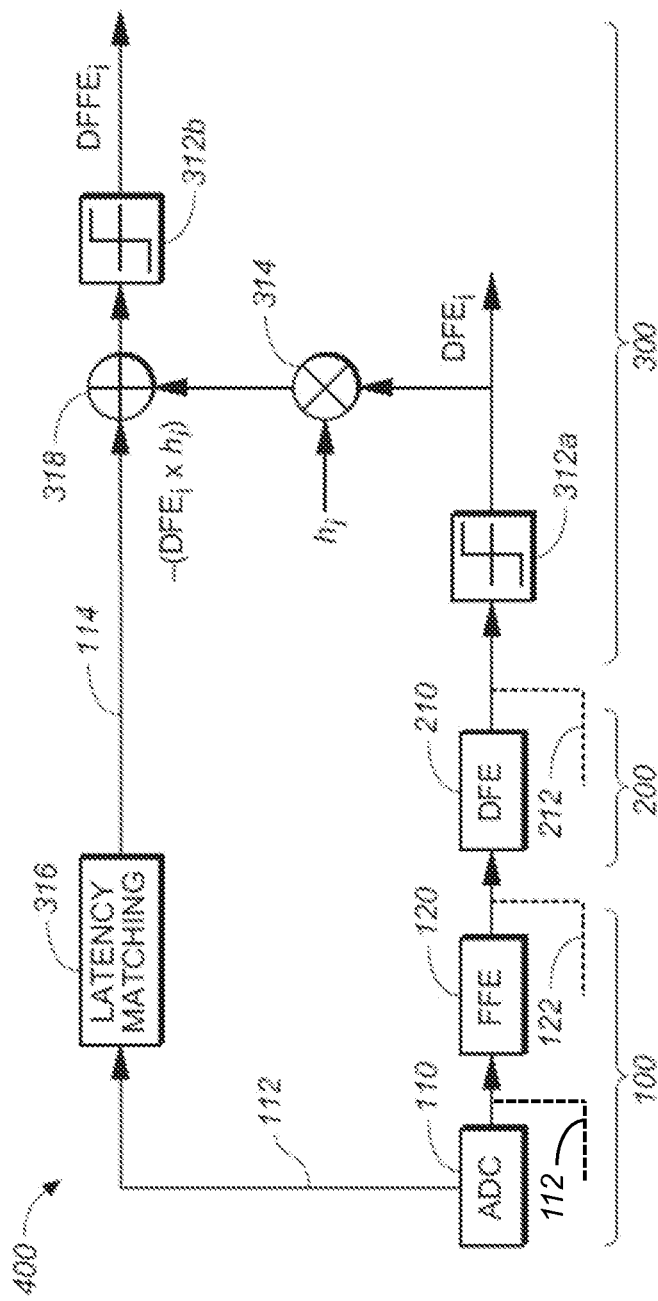
FIG. 2 is a block diagram of an embodiment of a data path and its components according to the invention.

FIG. 2 illustrates an embodiment of data path 400 in which decision feed forward equalizer (DFFE) block 300 includes a single DFFE slice. In embodiments, a DFFE slice can include combiner (ex.—subtractor) 318, product block (ex.—multiplier) 314, and decision devices (ex.—slicers, comparators) 312a and 312b. In embodiments, DFFE slicer 312a can generate hard decision bits $DFE_i$ from input decision bits 212 generated by the DFE 210. In embodiments, product block 314 can then multiply $DFE_i$ by a coefficient $h_i$ generated by adaptive filter 140 of block too to approximate inter-symbol interference (ISI); this approximate ISI ($DFE_i \times h_i$) can then be subtracted by combiner 318 from a latency-matched raw (ex.—non-filtered, non-equalized) digital input symbol 114 generated by ADC 110 to generate a final equalized output symbol and a hard decision $DFFE_i$. In embodiments, latency matching block 316 can time-align input symbols 112 from ADC 110 to account for preliminary equalization (via FFE 120 and DFE 210) or hard decision generation (ex.—slicing), delivering latency-matched input symbols 114 from ADC 110 to combiner 318. In embodiments, final output symbols generated by combiner 318 can then be received by decision device 312b for generation of hard decision bits $DFFE_0$ output by the DFFE slice of block 300.

Figure 3:
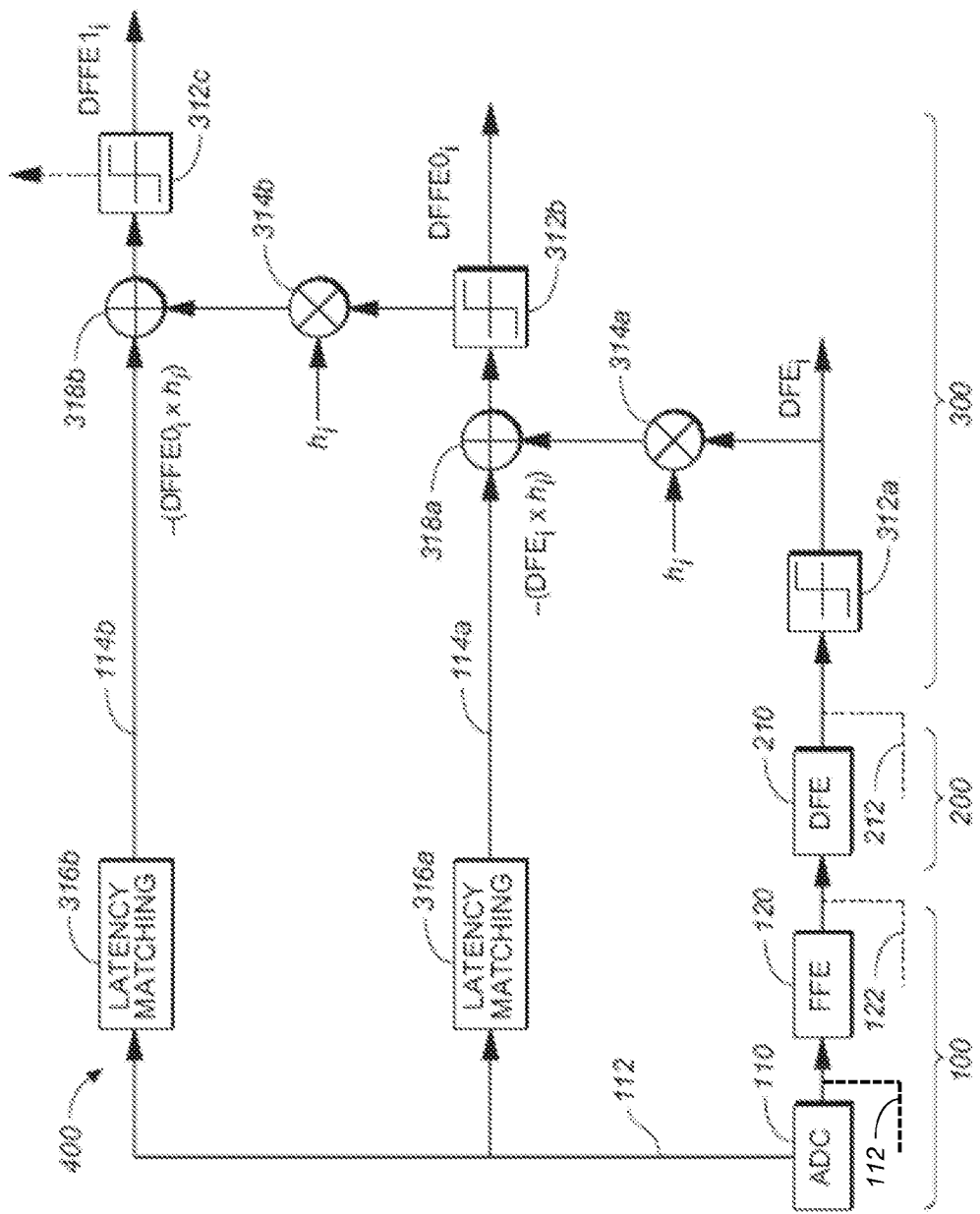
FIG. 3 is a block diagram of an embodiment of components of a data path including multiple DFFE slices according to the invention.

FIG. 3 illustrates an embodiment of data path 400 incorporating a k-slice cascading DFFE block 300 (where k is a positive integer). In embodiments, final hard decisions $DFFE_{0i}$ generated by decision device 312b and combiner 318a of slice n (o≤n<k) can then be received as input by product block 314b of slice n+1, where $DFFE_{0i}$ is again multiplied by coefficient $h_i$ to generate a subsequent product approximating ISI ($DFFE_{0i} \times h_i$). In embodiments, combiner 318b of slice n+1 can then subtract the subsequent product ($DFFE_{0i} \times h_i$) from a subsequent latency-matched input symbol 114b generated by ADC 110 (time-aligned for preliminary equalization as well as the components of previous DFFE slices 0, 1, . . . k−1. In embodiments, the resulting subsequent final output symbol can then be received by subsequent decision device 312c to generate hard decision bit $DFFE_{1i}$. In embodiments, subsequent decision bit $DFFE_{1i}$ can serve as data path output or as input for subsequent DFFE slices (as with previous hard decision bit $DFFE_{0i}$).

Figure 4:
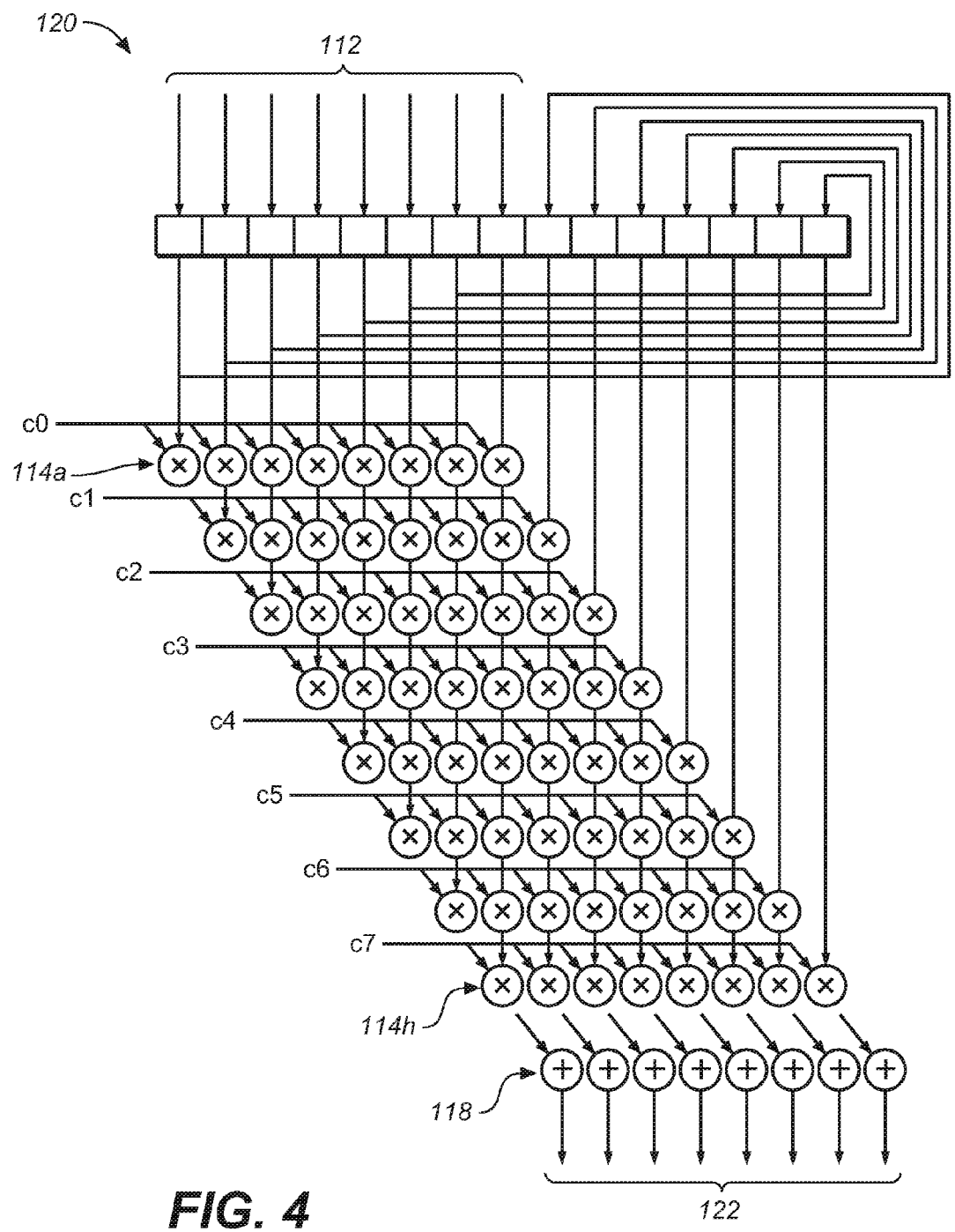
FIG. 4 is a block diagram of a prior art feed forward equalizer.

In embodiments of the DSP receiver data path, DFE 210 can be an 8-way parallel, 2-tap, fully unrolled DFE and FFE 120 can be an 8-way parallel finite impulse response (FIR) filter with variable coefficients and as shown in FIG. 4. Timing closure constraints on maximum clock speeds at current technology nodes (28 nm through 16 nm) provide for parallelism of 8-way or higher. Embodiments of the invention, however, can accommodate any level of parallelism provided for by available technology or target system requirements.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the invention described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A system for generating digital data from a received analog signal, comprising:
   an analog to digital converter configured to generate at least one input symbol from the received analog signal;
   at least one preliminary equalizer block including
      a feed forward equalizer configured to generate at least one first output symbol from the at least one input symbol by applying feed forward equalization to the at least one input symbol; and
      a decision feedback equalizer configured to generate at least one first hard decision from the at least one first output symbol by applying decision feedback equalization to the at least one first output symbol; and
   at least one decision feed forward (DFF) equalizer block including
      a latency matching block configured to generate at least one latency matched input symbol by setting a first delay of the at least one input symbol generated by the analog to digital converter;
      a product block configured to generate a product of at least one coefficient and the at least one first hard decision;
      a result block configured to generate at least one final output symbol by combining the product with the at least one latency matched input symbol; and
      a decision device configured to generate at least one second hard decision based on the at least one final output symbol.

2. The system of claim 1, further comprising:
a calibration block operably coupled to the analog to digital converter and configured to correct at least one of a gain mismatch, an offset mismatch, and a time error; and
an adaptation block configured to adjust a coefficient of at least one of the feed forward equalizer, the decision feedback equalizer, and the decision feed forward equalizer.

3. The system of claim 1, wherein
the product block is a multiplier configured to multiply the at least one first hard decision by at least one coefficient to approximate inter-symbol interference for the reconstructed analog signal; and
the result block is a combiner configured to subtract the approximate inter-symbol interference from the at least one latency matched input symbol.

4. The system of claim 1, wherein the decision device is at least one of a comparator or a slicer.

5. The system of claim 1, wherein at least one of the feed forward equalizer, the decision feedback equalizer, and the decision feed forward equalizer is an N-way parallel filter, where N is a positive integer.

6. The system of claim 1, wherein at least one DFF equalizer block is a subsequent DFF equalizer block including
a subsequent latency matching block configured to generate at least one subsequent latency matched input symbol by setting at least (i) a first delay of the at least one input symbol from the analog to digital converter and (ii) at least one subsequent delay of a hard decision generated by a prior DFF equalizer block;
a subsequent product block configured to generate at least one subsequent product of the hard decision and at least one coefficient;
a subsequent result block configured to generate at least one subsequent final output symbol by combining the subsequent product with the at least one subsequent latency matched input symbol; and
a subsequent decision device configured to generate at least one subsequent hard decision based on the at least one subsequent final output symbol.

7. The system of claim 6, wherein
the subsequent product block is a multiplier configured to multiply the at least one hard decision by at least one coefficient to approximate inter-symbol interference for the reconstructed analog signal; and
the subsequent result block is a combiner configured to subtract the approximate inter-symbol interference from the at least one subsequent latency matched input symbol.

8. The system of claim 1, wherein the system is embodied in a serializer/deserializer (SerDes) receiver device.

9. A method for generating equalized digital data from a received analog signal, comprising:
generating at least one input symbol from the received analog signal via an analog to digital converter;
generating at least one first output symbol by applying feed forward equalization to the at least one input symbol;
generating at least one first hard decision by applying decision feedback equalization to the at least one first output symbol;
generating at least one latency matched input symbol by setting a first delay of the at least one input symbol generated by the analog to digital converter;
generating a product of the at least one first hard decision and at least one coefficient;
generating at least one final output symbol by combining the product with the at least one latency matched input symbol; and
generating via a decision device at least one second hard decision based on the at least one final output symbol.

10. The method of claim 9, wherein the generating a product of the at least one first hard decision and at least one coefficient includes
multiplying the at least one first hard decision by at least one coefficient to approximate inter-symbol interference for the reconstructed analog signal.

11. The method of claim 9, wherein the generating at least one final output symbol by combining the product with the at least one latency matched input symbol includes
generating at least one final output symbol by subtracting the approximate inter-symbol interference from the at least one latency matched input symbol.

12. The method of claim 9, further comprising:
generating at least one subsequent latency matched input symbol by setting at least (i) a first delay of the at least one input symbol generated by the analog to digital converter and (ii) at least one subsequent delay of a hard decision generated by a prior DFF equalizer block;
generating at least one subsequent product of the at least one hard decision and at least one coefficient;
generating at least one subsequent final output symbol by combining the subsequent product with the at least one subsequent latency matched input symbol; and
generating at least one subsequent hard decision based on the at least one subsequent final output symbol.

13. The method of claim 12, wherein the generating at least one subsequent product of the at least one hard decision and at least one coefficient includes
multiplying the at least one hard decision by at least one coefficient to approximate inter-symbol interference for the reconstructed analog signal.

14. The method of claim 12, wherein the generating at least one subsequent final output symbol includes combining the subsequent product with the at least one subsequent latency matched input symbol to generate at least one subsequent final output symbol includes
generating at least one subsequent final output symbol by subtracting the approximate inter-symbol interference from the at least one latency matched input symbol.

15. The method of claim 12, wherein the generating at least one subsequent hard decision based on the at least one subsequent final output symbol includes
generating at least one subsequent hard decision based on the at least one subsequent final output symbol via at least one of a comparator and a slicer.

16. The method of claim 9, wherein the method is embodied in instructions executable by a processor operably coupled to a SerDes receiver.

17. A serializer/deserializer (SerDes) receiver device incorporating a system for generating digital data from a received analog signal, comprising:
an analog to digital converter configured to generate at least one input symbol from the received analog signal;
at least one preliminary equalizer block including
a feed forward equalizer configured to generate at least one first output symbol from the at least one input symbol by applying feed forward equalization to the at least one input symbol; and
a decision feedback equalizer configured to generate at least one first hard decision from the at least one first output symbol by applying decision feedback equalization to the at least one first output symbol; and at least one decision feed forward (DFF) equalizer block including
- a latency matching block configured to generate at least one latency matched input symbol by setting a first delay of the at least one input symbol generated by the analog to digital converter;
- a product block configured to generate a product of at least one coefficient and the at least one first hard decision;
- a result block configured to generate at least one final output symbol by combining the product with the at least one latency matched input symbol; and
- a decision device configured to generate at least one second hard decision based on the at least one final output symbol.

* * * * *